Patented Oct. 3, 1922.

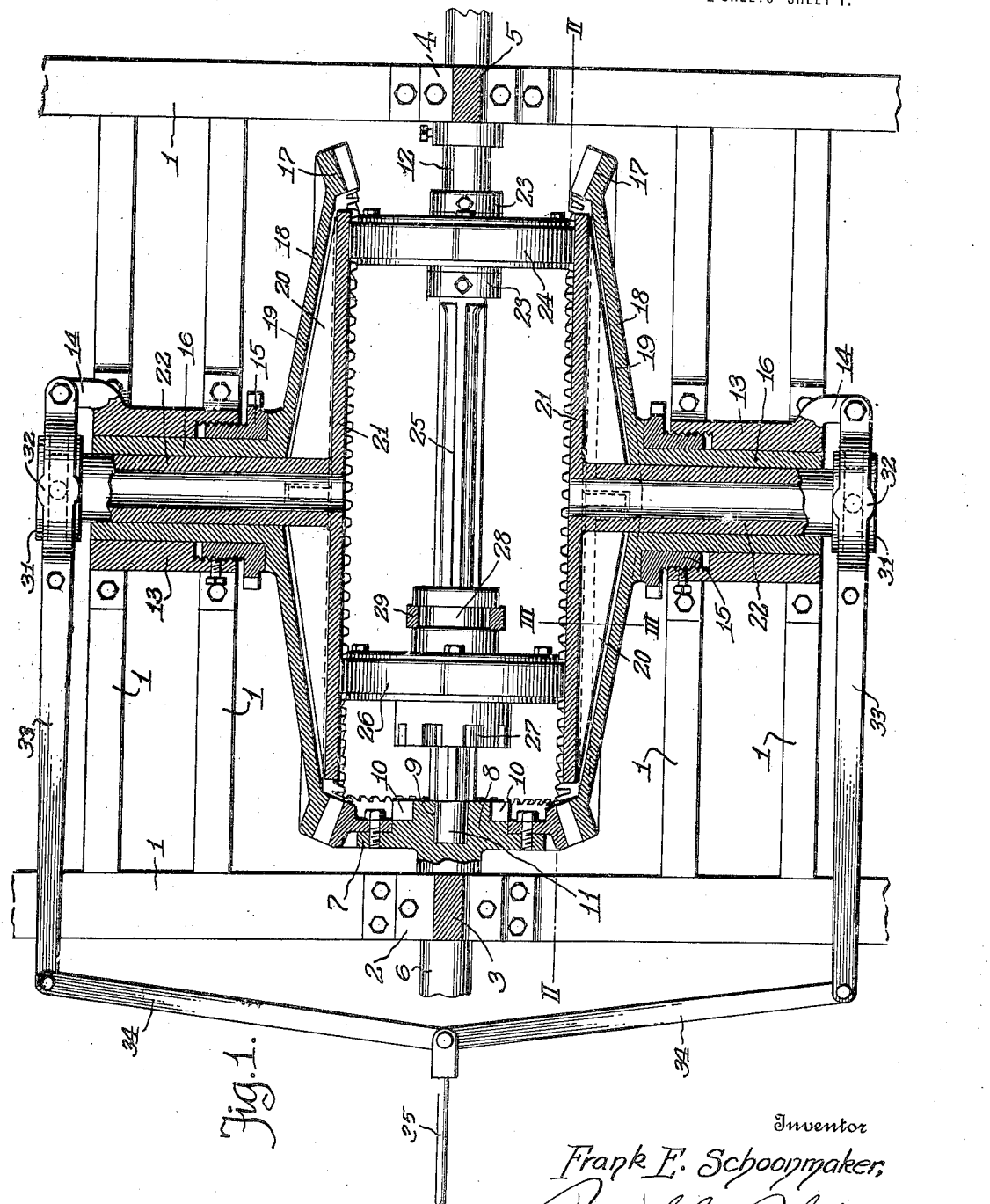

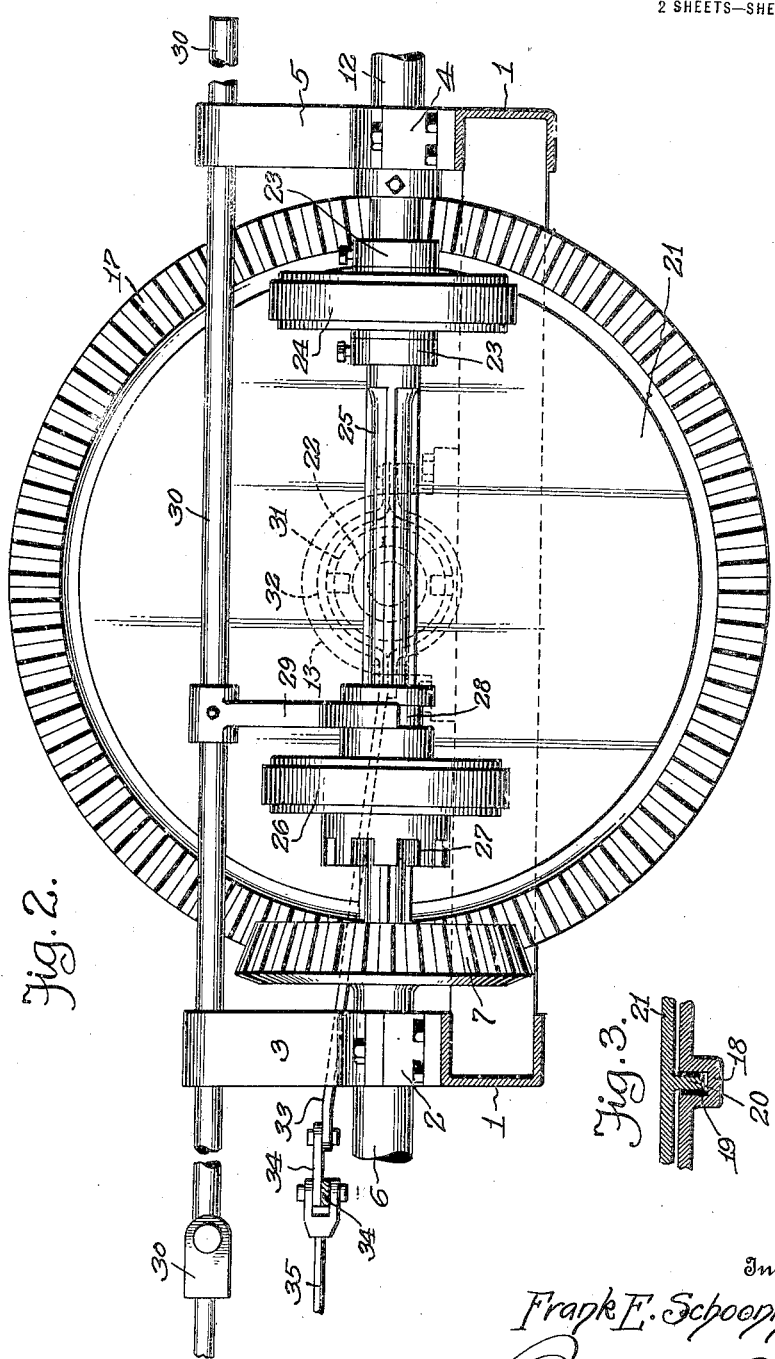

1,431,049

UNITED STATES PATENT OFFICE.

FRANK E. SCHOONMAKER, OF DETROIT, MICHIGAN.

TRANSMISSION MECHANISM.

Application filed February 28, 1921. Serial No. 448,397.

*To all whom it may concern:*

Be it known that I, FRANK E. SCHOONMAKER, a citizen of the United States of America, residing at Detroit, in the county of Wayne and State of Michigan, have invented certain new and useful Improvements in Transmission Mechanism, of which the following is a specification, reference being had therein to the accompanying drawings.

This invention relates to variable speed transmission mechanism especially designed for automobiles and power driven vehicles, but applicable to variable speed lathes and other types of machinery.

The primary object of my invention is to provide a variable speed transmission mechanism that may be compactly housed in the chassis of an automobile, between the power plant and the rear axle assembly, for transmitting power from the power plant to the rear axle or shaft or any other shaft in proximity thereto. The mechanism is designed to afford a direct drive or variable speeds forward and reverse, and this is accomplished by the shifting of a single traction wheel relative to driven wheels.

Another object of this invention is to provide a transmission mechanism embodying novel, driven gear wheels, having portions adapted to be shifted in synchronism to control the application of power, thus obviating the necessity of employing the usual clutch in the line drive of an automobile or similar vehicle.

A further object of this invention is to provide a power transmission mechanism embodying opposed parallel driving members with a shiftable traction wheel therebetween and another wheel which prevents stresses and strains on the driving members from displacing said members or causing unnecessary wear and tear during the use of the transmission mechanism.

A still further object of this invention is to provide a transmission mechanism wherein the parts are constructed with a view of reducing the cost of manufacture and at the same time retain those features by which durability, accessibility and ease of control are secured. These and other ends are attained by a construction that will be hereinafter described and then claimed, and reference will now be had to the drawings, wherein—

Figure 1 is a horizontal sectional view of the power transmission mechanism;

Fig. 2 is a longitudinal sectional view of the same taken on the line II—II of Fig. 1; and Fig. 3 is a cross sectional view of one of the driving members taken on the line III—III of Fig. 1.

Reference will now be had to the drawings wherein the reference numeral 1 denotes a supporting frame adapted to form part of the chassis or vehicle frame and on the forward end of the frame 1 are bearings 2 and 3 longitudinally alining with similar bearings 4 and 5 on the rear end of the supporting frame. In the bearing 2 is journaled a drive shaft 6 adapted to be operated directly or indirectly from a power plant (not shown). On the rear end of the drive shaft 6 is a small beveled gear wheel 7 having its hub portion 8 provided with a socket 9 and clutch teeth 10. Journaled in the socket 9 is the forward reduced end 11 of a driven shaft 12, which is journaled in the bearing 4 and longitudinally alines with the drive shaft 6. This driven shaft is adapted to transmit power to the rear axle or shaft of an automobile or similar vehicle.

Mounted on the supporting frame 1 are transversely alining bearings 13 having the outer ends thereof provided with brackets 14 and the inner ends of the bearings provided with adjustable glands or wear compensating members 15. Journaled in the bearings 13 are the hollow hubs 16 of large opposed beveled gear wheel 17 meshing with the small gear wheel 7 of the drive shaft 6. The large gear wheels 17 may be maintained in proper mesh with the small gear wheel 7 by adjusting the glands or members 15, and said large gear wheels have the web or body portions 18 thereof provided with radially disposed recesses or grooves 19 to receive radially disposed ribs 20 carried by driving members 21 which have tubular spindles 22 journaled in the hollow hubs 16 and slidable longitudinally thereof. The driving members 21 conform to large disks which are reinforced by the ribs 20 and with said ribs extending into the recesses or grooves 19 a driving relation is established between the driving members 21 and the large gear wheels 17.

Mounted on the driven shaft 12 are collars 23 and loose on said driven shaft, between said collars is the revoluble spacing wheel or member 24 having its periphery engaging confronting faces of the driving members 21 adjacent the peripheral edges thereof, or at what may be considered the rear end edges of said driving members.

The forward end of the driven shaft 12 has splines or keys 25 for a slidable traction wheel 26 which may be shifted longitudinally of the driven shaft and at all times remain in driving relation thereto. The shiftable traction wheel 26 is adapted to have its periphery engaged by the driving members 21 and said traction wheel has its hub provided with clutch teeth 27 adapted to engage the clutch teeth 10 of the gear wheel hub 8 so that high speed or direct drive may be obtained when the traction wheel 26 is shifted forwardly, with the driving members 21 retracted, as will be hereinafter described.

The traction wheel 26 also has its hub provided with a grooved collar 28 loosely engaged by a depending fork 29 mounted on a shift rod 30 slidable in the bearings 3 and 5 of the supporting frame 1. The shift rod 30 is connected to a suitable operating mechanism and it is through the medium of said shift rod that the traction wheel 26 may be shifted on the driven shaft 12 to attain a desired speed forward or reverse.

The relative depth of the recesses 19 and the ribs 20 is such that the driving members 21 may be shifted, in and out, relative to the webs 18 of the large gear wheels 17 and for this purpose the outer ends of the spindles 22 are provided with grooved collars 31 loosely engaged by the forks or yokes 22 of levers 33 pivotally attached to the brackets 14 of the bearings 13, said levers extending forwardly with the forward ends thereof connected by links 34 to an operating rod 35. By moving the operating rod 35 forward and backward the driving members may be shifted in unison to and from the periphery of the traction wheel 26 and consequently the application of power to the wheel 26 may be easily controlled.

In the operation of the transmission mechanism low speed is attained when the traction wheel 26 is adjacent the center of the driving members 21 and the speed may be gradually increased by shifting the traction wheel 26 forwardly from the centers of the driving members 21 towards the small gear wheel 7; high speed being attained either adjacent the peripheral edges of the driving members 21 or when the traction wheel 26 is interlocked with the small gear wheel 7 for high speed or direct drive.

For reverse drive, at variable speeds, the traction wheel 26 is shifted rearwardly from the centers of the driving members 21 towards the spacing wheel or member 24, and when it is desired to disconnect the power at any of these speeds it is only necessary to retract the driving members 21 through the medium of the levers 33 which may be actuated by pushing rearwardly on the operating rod 35. Pulling forwardly on said rod shifts the driving members 21 towards each other and against the peripheries of the wheels 24 and 26, thus establishing a positive driving relation between said wheels and the driving members 21. The wheels 24 and 26 may have the peripheries thereof provided with detachable non-slipping wear rims or bands and the small and large gear wheels may be rendered noiseless by using bakelite or any other suitable material as teeth for the gear wheels.

While the shiftable traction wheel 26 is being used for variable forward speeds and pressure maintained on the periphery of said wheel by the driving members 21, the rear end edges of said driving members are maintained in spaced relation by the wheel or member 24, consequently the spindles 22 of the driving members are maintained in proper transverse alinement and free to easily slide in the hollow hub 16 of the larger gear wheel 17 when the driving members 21 are shifted by the operating rod 35.

From the foregoing, it will be observed that a maximum power may be obtained by the driven shaft 12 from the drive shaft 6, and that variable speeds are attainable without resorting to a multiplicity of shiftable or constantly meshing gears. It is thought that the operation and utility of the transmission mechanism will be apparent without further description, and while in the drawing there is illustrated a preferred embodiment of my invention, it is to be understood that the structural elements are susceptible to such changes, in size, shape and manner of assemblage, as fall within the scope of the appended claims.

What I claim is:

1. In a power transmission mechanism, a driven gear wheel having radially disposed recesses, a driving member set in said gear wheel and having ribs in the recesses of said driven gear wheel to establish a constant driving relation, a traction wheel adapted to be driven by said driving member, and means axially of said gear wheel for bodily shifting said driving member relative to said traction wheel.

2. A power transmission mechanism comprising a drive shaft, a driven shaft alining therewith, a small gear wheel on said drive shaft, large opposed gear wheels meshing with said small gear wheel, said gear wheels having body portions thereof provided with recesses, shiftable opposed driving members having ribs extending into the recesses of said large gear wheels to establish a driving relation therewith, a shiftable traction wheel on said driven shaft and adapted to be driven by said opposed driving members engaging the periphery of said traction wheel, means adapted for shifting said traction wheel for variable speeds from said driving members, and also into engagement with said small gear wheel for high speed or direct drive, and means operatable in the central vertical plane of said power transmission mechanism adapted for simultaneously shifting said driving members to control the application of power to said traction wheel.

In testimony whereof I affix my signature in presence of two witnesses.

FRANK E. SCHOONMAKER.

Witnesses:
 ANNA M. DORR,
 KARL H. BUTLER.